US012664196B1

(12) United States Patent
Woods et al.

(10) Patent No.: US 12,664,196 B1
(45) Date of Patent: Jun. 23, 2026

(54) APPARATUS AND METHOD FOR GENERATING ONE OR MORE SYNTHESIZED OUTPUTS

(71) Applicant: AI Leadership Labs, LLC, Austin, TX (US)

(72) Inventors: Geoff Woods, Austin, TX (US); Randall Joseph Ottinger, Bellevue, WA (US)

(73) Assignee: AI Leadership Labs, LLC, Austin, TX (US)

( * ) Notice: Subject to any disclaimer, the term of this patent is extended or adjusted under 35 U.S.C. 154(b) by 0 days.

(21) Appl. No.: 19/378,958

(22) Filed: Nov. 4, 2025

(51) Int. Cl.
| | |
|---|---|
| *G06F 16/338* | (2019.01) |
| *G06F 16/3332* | (2025.01) |
| *G06F 16/358* | (2025.01) |
| *G06F 40/30* | (2020.01) |
| *G06N 3/0475* | (2023.01) |

(52) U.S. Cl.
CPC ........ G06F 16/338 (2019.01); G06F 16/3334 (2019.01); G06F 16/358 (2019.01); G06F 40/30 (2020.01); G06N 3/0475 (2023.01)

(58) Field of Classification Search
CPC .. G06F 16/338; G06F 16/3334; G06F 16/358; G06F 40/30; G06N 3/0475
USPC ........................................................ 707/722
See application file for complete search history.

(56) References Cited

U.S. PATENT DOCUMENTS

| | | | |
|---|---|---|---|
| 2025/0077849 A1* | 3/2025 | Deziel .................... | G06N 20/00 |
| 2025/0139556 A1 | 5/2025 | David et al. | |
| 2025/0265243 A1* | 8/2025 | Mishra .............. | G06F 16/24578 |

FOREIGN PATENT DOCUMENTS

| | | |
|---|---|---|
| IN | 202541006518 A | 2/2025 |
| IN | 202511037491 A | 5/2025 |
| IN | 202511054666 A | 6/2025 |

* cited by examiner

*Primary Examiner* — Cam Y T Truong
(74) *Attorney, Agent, or Firm* — Caldwell LLC

(57) ABSTRACT

An apparatus and method for generating one or more synthesized outputs. The apparatus includes at least a processor and a memory communicatively connected to the at least a processor. The memory instructs the processor to generate a first prompt of a plurality of prompts, wherein the first prompt is associated with an entity, transmit the first prompt to a plurality of user devices, wherein each user device is associated with a user profile of a plurality of user profiles, aggregate, using an aggregation engine, a plurality of responses to the first prompt, wherein aggregating the plurality of responses comprises receiving, through a user interface of the plurality of user devices, the plurality of responses and registering, using metadata of the user profile, the plurality of responses with a user, and generate a synthesized output of one or more synthesized outputs based on the aggregated plurality of responses.

16 Claims, 7 Drawing Sheets

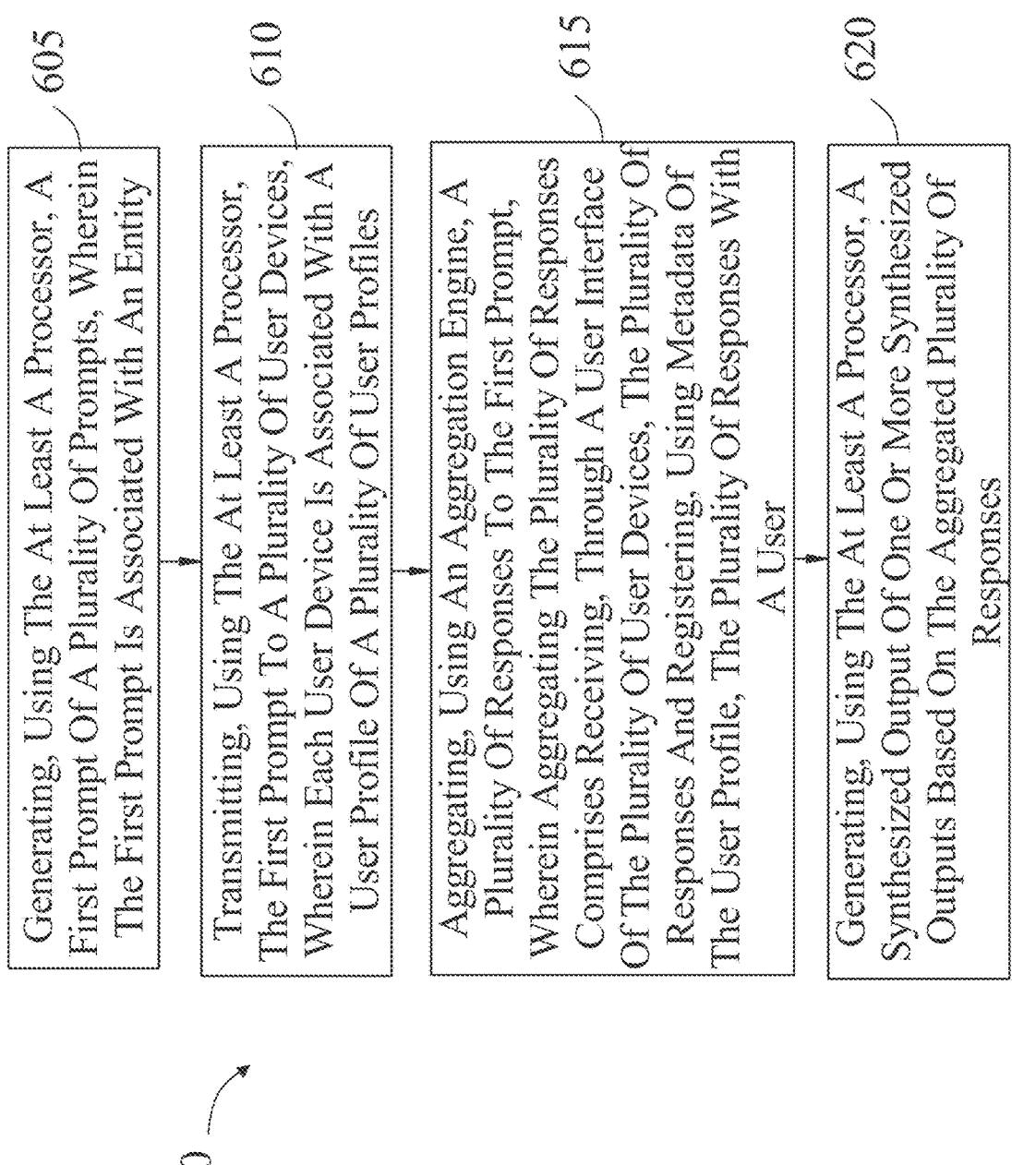

600

605
Generating, Using The At Least A Processor, A First Prompt Of A Plurality Of Prompts, Wherein The First Prompt Is Associated With An Entity 610
Transmitting, Using The At Least A Processor, The First Prompt To A Plurality Of User Devices, Wherein Each User Device Is Associated With A User Profile Of A Plurality Of User Profiles 615
Aggregating, Using An Aggregation Engine, A Plurality Of Responses To The First Prompt, Wherein Aggregating The Plurality Of Responses Comprises Receiving, Through A User Interface Of The Plurality Of User Devices, The Plurality Of Responses And Registering, Using Metadata Of The User Profile, The Plurality Of Responses With A User 620
Generating, Using The At Least A Processor, A Synthesized Output Of One Or More Synthesized Outputs Based On The Aggregated Plurality Of Responses

FIG. 6

APPARATUS AND METHOD FOR GENERATING ONE OR MORE SYNTHESIZED OUTPUTS

FIELD OF THE INVENTION

The present invention generally relates to the field of machine learning. In particular, the present invention is directed to an apparatus and a method for generating one or more synthesized outputs.

BACKGROUND

When multiple user devices provide responses to prompts associated with a subject, the responses often differ in structure, content, and relevance. This variability makes it difficult to register responses accurately with corresponding user metadata and to determine the weight or significance of each response. Without an effective mechanism for processing and organizing the responses, generating coherent and meaningful outputs from the aggregated data remains a challenge.

SUMMARY OF THE DISCLOSURE

In an aspect, an apparatus for generating one or more synthesized outputs includes at least a processor and a memory communicatively connected to the at least a processor. The memory contains instructions configuring the processor to generate a first prompt of a plurality of prompts, wherein the first prompt is associated with an entity, transmit the first prompt to a plurality of user devices, wherein each user device is associated with a user profile of a plurality of user profiles, aggregate, using an aggregation engine, a plurality of responses to the first prompt, wherein aggregating the plurality of responses comprises, receiving, through a user interface of the plurality of user devices, the plurality of responses and registering, using metadata of the user profile, the plurality of responses with a user, and generate a synthesized output of one or more synthesized outputs based on the aggregated plurality of responses.

In another aspect, a method for generating one or more synthesized outputs includes generating, using the at least a processor, a first prompt of a plurality of prompts, wherein the first prompt is associated with an entity, transmitting, using the at least a processor, the first prompt to a plurality of user devices, wherein each user device is associated with a user profile of a plurality of user profiles, aggregating, using an aggregation engine, a plurality of responses to the first prompt, wherein aggregating the plurality of responses comprises receiving, through a user interface of the plurality of user devices, the plurality of responses and registering, using metadata of the user profile, the plurality of responses with a user, and generating, using the at least a processor, a synthesized output of one or more synthesized outputs based on the aggregated plurality of responses.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is a block diagram of an exemplary method for generating one or more synthesized outputs.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating one or more synthesized outputs. The apparatus includes at least a computing device comprised of a processor and a memory communicatively connected to the processor. The memory instructs the processor to generate a first prompt of a plurality of prompts, wherein the first prompt is associated with an entity. The processor transmits the first prompt to a plurality of user devices, wherein each user device is associated with a user profile of a plurality of user profiles. The processor aggregates, using an aggregation engine, a plurality of responses to the first prompt, wherein aggregating the plurality of responses comprises receiving, through a user interface of the plurality of user devices, the plurality of responses and registering, using metadata of the user profile, the plurality of responses with a user. Additionally, the processor generates a synthesized output of one or more synthesized outputs based on the aggregated plurality of responses.

Figure 1:
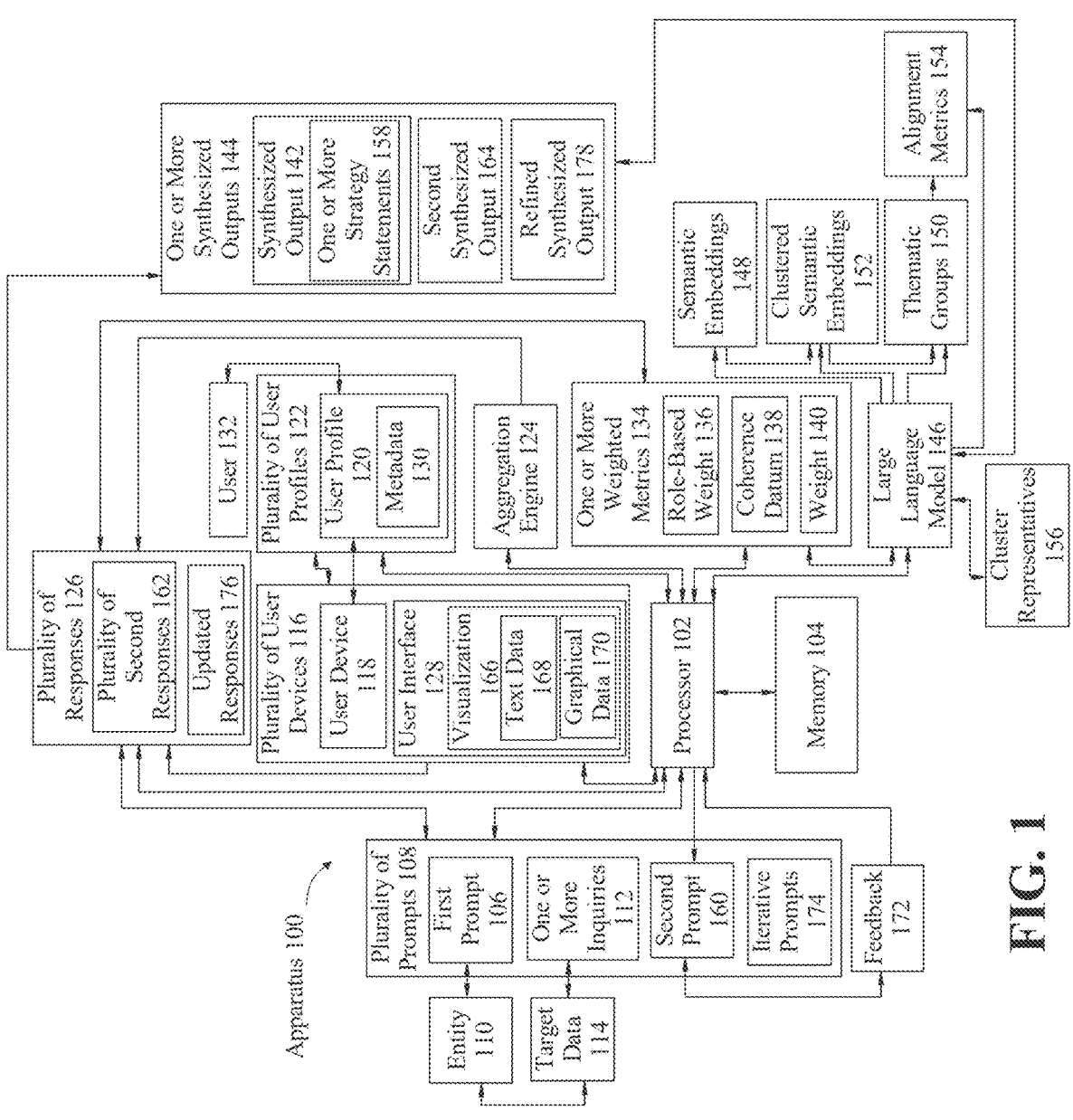
FIG. 1 is a block diagram of an apparatus for generating one or more synthesized outputs.

Referring now to FIG. 1, an exemplary embodiment of apparatus 100 for generating one or more synthesized outputs is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to generate a first prompt 106 of a plurality of prompts 108, wherein the first prompt 106 is associated with an entity 110. As used in this disclosure, a "first prompt" is an initial inquiry or instruction generated by the processor 102 from among a plurality of prompts 108, the first prompt 106 being associated with an entity 110. In a non-limiting example, the first prompt 106 may include an initial question directed to a participant. In another non-limiting example, the first prompt 106 may include an interview-style query presented to an individual user. In another non-limiting example, the first prompt 106 may include a directive to provide feedback, a request for data entry, or a targeted survey item. As used in this disclosure, "prompts" are one or more inquiries, instructions, or communications generated by the processor 102 and transmitted to user devices 116, the prompts 108 being configured to elicit responses 126 associated with a subject of interest. In a non-limiting example, the prompts 108 may include survey questions designed to capture user preferences. In another non-limiting example, the prompts 108 may include open-ended queries to solicit descriptive responses 126. In another non-limiting example, the prompts 108 may include structured multiple-choice questions, task instructions, or scenario-based decision-making items. As used in this disclosure, an "entity" is a subject or target associated with a prompt. In a non-limiting example, the entity 110 may include an organization such as a company, business, or governmental agency. In another non-limiting example, the entity 110 may include a non-organizational group such as a research team, a community, or an educational institution. In another non-limiting example, the entity 110 may include a technical system, a product, a service, or an abstract concept under evaluation.

With continued reference to FIG. 1, in a non-limiting example, the first prompt 106 may be generated automatically by the apparatus 100 using stored instructions executed by the processor 102. In another non-limiting example, the first prompt 106 may be predefined by a user 132 through a configuration interface, such as a graphical interface or command-line input. In yet another non-limiting example, the first prompt 106 may be dynamically generated by the apparatus 100 based on metadata 130 associated with the entity 110, such as historical records, performance metrics, prior user responses 126, and the like. Without limitation, the processor 102 may generate the first prompt 106 by retrieving prompt templates stored in memory 104 and filling variable fields with entity-specific data. In a non-limiting example, the templates may include structured text strings, parameterized placeholders, preformatted interview items, and the like that the processor 102 populates with relevant data retrieved from a database. In another non-limiting example, the apparatus 100 may employ a rules-based engine that selects a prompt from a set of stored prompts 108 according to decision logic tied to the entity 110 metadata 130. In another non-limiting example, the apparatus 100 may utilize a machine learning model configured to synthesize a natural-language prompt based on semantic embeddings 148 of the entity data. As used in this disclosure, "entity data" is information associated with an entity 110. In an embodiment, entity data may be accessed, processed, or analyzed by the apparatus 100 to generate one or more prompts 108 or outputs. In a non-limiting example, the entity data May include organizational information such as goals, objectives, or strategic plans. In another non-limiting example, the entity data may include operational details such as performance metrics, milestones, workflow requirements, and the like. In another non-limiting example, the entity data may include descriptive information such as product specifications, service attributes, or technical parameters. In another non-limiting example, the entity data may include historical records, prior user responses 126, feedback, and the like associated with the entity 110.

With continued reference to FIG. 1, the plurality of prompts 108 comprise one or more inquiries 112 associated with target data 114 associated with the entity 110. As used in this disclosure, an "inquiry" is a request for information, clarification, or input presented to a user 132 through a prompt. In a non-limiting example, an inquiry may include a direct question seeking factual information. In another non-limiting example, an inquiry may include an open-ended request for opinion or perspective. In another non-limiting example, an inquiry may include a task-oriented instruction requiring a user 132 to provide evaluative or descriptive input. As used in this disclosure, "target data" is information associated with an entity 110 to which one or more prompts 108 are directed. In a non-limiting example, the target data 114 may include a goal of a company. In another non-limiting example, the target data 114 may include performance metrics, milestones, objectives, and the like associated with the entity 110. In another non-limiting example, the target data 114 may include product specifications, operational requirements, strategic priorities, and the like, of the entity 110. In a non-limiting example, the plurality of prompts 108 may be linked to one or more inquiries 112 by associating each prompt with a corresponding subject of interest. The inquiries 112 may, in turn, be linked to target data 114 by referencing specific information that the inquiry is intended to elicit, such as goals, metrics, or descriptive attributes of the entity 110. The target data 114 may then be linked to the entity 110 by associating the information with stored entity data, which may include identifiers, metadata 130, or records that define the entity 110 within the system. In another non-limiting example, the processor 102 may implement this linking by maintaining relational data structures, such as tables, graphs, or mapping functions, in which each prompt is connected to its corresponding inquiry, each inquiry is mapped to relevant target data 114, and the target data 114 is indexed to the entity 110. In another non-limiting example, the linking may be implemented through semantic embedding techniques that cluster prompts 108 and inquiries 112 around target data 114 representations, which are themselves derived from stored entity data. In an embodiment, the linking may be implemented through semantic embedding techniques in which prompts 108 and inquiries 112 are converted into numerical vector representations. For example, without limitation, the processor 102 may generate semantic embeddings 148 of the prompts 108 and inquiries 112 using a trained machine learning model, such as a transformer-based language model. The processor 102 may then cluster the embeddings to identify similarities among prompts 108 and inquiries 112, thereby grouping them according to shared semantic features. The clustered prompts 108 and inquiries 112 may be anchored to target data 114 representations, which are likewise derived from stored entity data. For example, without limitation, the target data 114 representations may be computed using metadata 130, textual descriptions, or numerical attributes associated with the entity 110, thereby ensuring that the prompts 108 and inquiries 112 are semantically aligned with the stored entity data.

Still referring to FIG. 1, processor 102 is configured to transmit the first prompt 106 to a plurality of user devices 116, wherein each user device 118 is associated with a user profile 120 of a plurality of user profiles 122. As used in this disclosure, a "user device" is a computing device that is configured to receive prompts 108, present inquiries 112, and transmit responses 126 to the apparatus 100. In a non-limiting example, the user device 118 may include a mobile phone, a tablet computer, or a laptop computer. In another non-limiting example, the user device 118 may include a desktop computer, a wearable device, or a specialized terminal. In another non-limiting example, the user device 118 may include a network-enabled appliance, an augmented reality headset, or any other electronic device capable of communicating with the apparatus 100. As used in this disclosure, a "user profile" is a data structure associated with a user 132 that contains metadata 130 used by the apparatus 100 to register, process, or weigh responses 126. In a non-limiting example, the user profile 120 may include demographic information such as a role, title, or department of a user 132 within an entity 110. In another non-limiting example, the user profile 120 may include access permissions, response history, or weights assigned to prior interactions. In another non-limiting example, the user profile 120 may include behavioral indicators, device identifiers, or preference settings that affect how prompts 108 are delivered and responses 126 are interpreted.

With continued reference to FIG. 1, in an embodiment, the processor 102 may transmit the first prompt 106 to a plurality of user devices 116 by initiating a communication protocol over a network connection. For example, without limitation, the first prompt 106 may be transmitted as a data packet formatted in a markup language, such as JSON or XML, and delivered through an application programming interface (API) to each user device 118. Each user device 118 may then present the first prompt 106 through a graphical user interface, such as a mobile application display, a web-based dashboard, or a desktop client interface. The association between the user device 118 and a corresponding user profile 120 may be established at the time of transmission by referencing a unique identifier, such as a username, login credential, token, or device-specific identifier. For example, without limitation, the processor 102 may retrieve a user profile 120 from memory 104 based on a session token stored on the user device 118, and the prompt may be displayed in a manner tailored to the metadata 130 of that user profile 120. In another embodiment, the processor 102 may simultaneously transmit the first prompt 106 to multiple user devices 116 in parallel, wherein each device displays the prompt in accordance with the user's profile attributes, such as preferred language, access permissions, presentation format, and the like.

Still referring to FIG. 1, processor 102 is configured to aggregate, using an aggregation engine 124, a plurality of responses 126 to the first prompt 106, wherein aggregating the plurality of responses 126 comprises receiving, through a user interface 128 of the plurality of user devices 116, the plurality of responses 126 and registering, using metadata 130 of the user profile 120, the plurality of responses 126 with a user 132. As used in this disclosure, an "aggregation engine" is a component of the apparatus 100 configured to collect, organize, and process multiple responses 126 received from user devices 116. In a non-limiting example, the aggregation engine 124 may include software instructions executed by the processor 102 to compile responses 126 into a unified dataset. In another non-limiting example, the aggregation engine 124 may include hardware-accelerated modules configured to handle large-scale data streams. As used in this disclosure, "hardware-accelerated modules" are computing components or subsystems configured to perform specific operations more efficiently than general-purpose processors by using specialized hardware. In a non-limiting example, hardware-accelerated modules may include graphics processing units (GPUs) optimized for parallel processing of matrix operations. In another non-limiting example, hardware-accelerated modules may include tensor processing units (TPUs) configured for machine learning inference and training tasks. In another non-limiting example, hardware-accelerated modules may include field-programmable gate arrays (FPGAs) or application-specific integrated circuits (ASICs) configured to accelerate clustering, embedding generation, or response aggregation. For example, without limitation, an FPGA may be programmed to perform k-means clustering iterations in parallel, thereby reducing the time required to group large volumes of response embeddings. In another embodiment, the FPGA may be configured to compute similarity scores, such as cosine similarity, between embeddings at high throughput, enabling efficient identification of semantically related responses 126. In another non-limiting example, the hardware-accelerated modules may include application-specific integrated circuits (ASICs) designed for embedding generation. For example, without limitation, an ASIC may implement dedicated circuits for performing matrix multiplications and activation functions used in neural network inference, thereby accelerating the process of converting responses 126 into semantic embeddings 148. In another embodiment, the ASIC may be configured with pipelines optimized for text tokenization, vector normalization, or dimensionality reduction, further reducing computational overhead. In a further non-limiting example, both FPGAs and ASICs may be configured to accelerate response aggregation. For example, without limitation, the modules may include circuitry for summing, averaging, or weighting large sets of responses 126 in real time, enabling the aggregation engine 124 to process high-volume user inputs without bottlenecks. In another embodiment, the hardware-accelerated modules may support direct memory access (DMA) pathways that transfer intermediate aggregation results to system memory or GPUs without processor 102 intervention, further optimizing throughput. n a further non-limiting example, hardware-accelerated modules may include network interface cards or storage controllers equipped with dedicated processors to speed up data transfer and retrieval during aggregation. In another non-limiting example, the aggregation engine 124 may apply rules, weighting functions, or clustering techniques to the responses 126 in order to prepare them for subsequent synthesis. As used in this disclosure, a "response" is a unit of information provided by a user 132 through a user device 118 in reply to a prompt or inquiry. In a non-limiting example, a response may include textual input entered through a keyboard. In another non-limiting example, a response may include audio input, gesture input, or graphical selections made through an interface. In another non-limiting example, a response may include structured data such as multiple-choice selections, numerical entries, or form submissions.

With continued reference to FIG. 1, as used in this disclosure, "metadata" is descriptive information associated with a user profile 120 or response. Without limitation, the metadata 130 may be used by the apparatus 100 to register, classify, and/or weigh the response. In a non-limiting example, metadata 130 may include identifiers such as a username, account number, device ID, and the like. In another non-limiting example, metadata 130 may include contextual attributes such as a timestamp, location, language preference, and the like. In another non-limiting example, metadata 130 may include role-based information such as a department of a user 132, access level, organizational position, and the like. As used in this disclosure, a "user" is an individual or agent that interacts with the apparatus 100 through a user device 118 to provide responses 126 to prompts 108. In a non-limiting example, a user 132 may include a participant in a survey, an employee of an organization, a member of a research study, and the like. In another non-limiting example, a user 132 may include a customer, a stakeholder, a consultant contributing input, and the like. In another non-limiting example, a user 132 may include an automated agent, such as a bot or scripted process, configured to act on behalf of a human participant. As used in this disclosure, a "user interface" is a collection of hardware and/or software components configured to enable interaction between a user 132 and a computing device, wherein the user interface 128 facilitates the presentation of data to the user 132 and the reception of input from the user 132. The user interface 128 may include, without limitation, graphical user interfaces, command-line interfaces, application programming interfaces, voice-based interfaces, haptic interfaces, or augmented reality interfaces. A "graphical user interface," as used herein, is a graphical form of user interface 128 that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user 132 performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface and an event handler may operate together to enable seamless interaction between the user 132 and the apparatus 100. The GUI serves as the visual and interactive layer through which the user 132 engages with the apparatus 100, presenting elements such as buttons, sliders, input fields, and informational displays. The event handler, on the other hand, functions as the underlying mechanism that monitors and responds to user interactions with the GUI. For example, when a user 132 clicks a button on the GUI to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses 126, such as displaying output, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts 108 for further information, may compare data to validation rules such as requirements that the data in question be entered within certain numerical ranges, and/or may modify data and/or generate warnings to a user 132 in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user 132. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface. In some embodiments, visual element may be interacted with. For example, visual element may include an interface, such as a button or menu. In some embodiments, visual element may be interacted with using a user device 118 such as a smartphone, tablet, smartwatch, or computer.

With continued reference to FIG. 1, in an embodiment, the apparatus 100 and or the downstream device may include a data structure. As used in this disclosure, "data structure" is a way of organizing data represented in a specialized format on a computer configured such that the information can be effectively presented in a graphical user interface. In some cases, the data structure includes any input data. In some cases, the data structure contains data and/or rules used to visualize the graphical elements within a graphical user interface. In some cases, the data structure may include any data described in this disclosure. In some cases, the data structure may be configured to modify the graphical user interface, wherein data within the data structure may be represented visually by the graphical user interface. In some cases, the data structure may be continuously modified and/or updated by processor 102, wherein elements within graphical user interface may be modified as a result. In some cases, processor 102 may be configured to transmit display device and or the downstream device the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user 132 interacts with a dropdown menu in the GUI to select a topic, the event handler May capture this input and accesses a data structure. The data structure may retrieve the relevant information such as, text explanations, videos, or interactive exercises, and passes it back to the event handler, which may then trigger the appropriate updates to the GUI. In another embodiment, the data structure may also maintain the state of the system, tracking user progress, preferences, and session history. For instance, without limitation, a hash table may store user specific configurations which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface (GUI) that allows users to perform actions, provide input, or engage with the apparatus 100. Interactive elements may be designed to facilitate two-way communication between the user 132 and the system, enabling the user 132 to influence the behavior of the apparatus 100 or obtain feedback 172 in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user 132 clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles 122 or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses 126, facilitating seamless integration and functionality across diverse systems.

With continued reference to FIG. 1, as used in this disclosure, "downstream device" is a device that accesses and interacts with apparatus 100. For instance, and without limitation, downstream device may include a remote device and/or apparatus 100. In a non-limiting embodiment, downstream device may be consistent with a computing device as described in the entirety of this disclosure. Without limitation, the downstream device may include a display device. As used in this disclosure, a "display device" refers to an electronic device that visually presents information to the entity 110. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textual, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user 132, wherein a user 132 may interact with a GUI. In some cases, a user 132 may view a GUI through display. Additionally, or alternatively, processor 102 be connected to display device. In one or more embodiments, transmitting the one or more synthesized outputs 144 may include displaying the one or more synthesized outputs 144 at display device using a visual interface.

With continued reference to FIG. 1, in an embodiment, the processor 102 may aggregate a plurality of responses 126 to the first prompt 106 by orchestrating an aggregation engine 124 that coordinates network input and output, parsing, normalization, and registration operations across user devices 116 and user profiles 122. For example, without limitation, the aggregation engine 124 may expose an authenticated endpoint such as HTTPS or gRPC that receives response payloads from the user interface 128 of each user device 118, where each payload may include fields such as a prompt identifier, a response identifier, a device identifier, a profile identifier, a timestamp, and a response body encoded in UTF-8 or Protocol Buffers. For example, without limitation, upon receipt the aggregation engine 124 may perform input validation such as schema conformance, size limits, and allowed MIME types, integrity checks such as cryptographic signature verification or message authentication code tied to the user profile 120, and de-duplication using the response identifier and a rolling window of time-stamps to prevent replay. For example, without limitation, valid payloads may be normalized by converting character encodings, stripping markup, expanding abbreviations, and mapping categorical selections to canonical codes stored in memory 104, and the normalized records may then be placed into an ingestion queue to decouple network latency from downstream processing. In an embodiment, registration of the plurality of responses 126 with a user 132 may be performed by joining each normalized response to metadata 130 of the user profile 120 stored in memory 104. For example, without limitation, the aggregation engine 124 may resolve the profile identifier or a session token to a user profile 120 and attach metadata 130 such as role, access level, locale, and device attributes, and may also derive contextual metadata 130 such as geolocation at coarse granularity, client version, or interface modality such as speech or text for auditability. For example, without limitation, the engine may persist the registered response as a row in a relational table or as a document in a key-value store with indexed fields such as prompt identifier, profile identifier, device identifier, timestamp, modality, role, and coherence score placeholder, thereby enabling efficient downstream weighting and synthesis. For example, without limitation, the engine may maintain an append-only audit log that links each response to its originating user device 118 and user profile 120 using foreign keys and includes verification artifacts such as signature hash and processing state such as received, normalized, or registered, which may be used for traceability and error recovery. In an embodiment, the aggregation engine 124 may operate in near real time by using a stream processor to enrich each response with user profile 120 metadata 130 before committing to storage. For example, without limitation, the engine may compute lightweight features at registration time such as token count, language identifier, or interface latency and store these alongside the metadata 130 of the user profile 120 to support later weighting steps without re-scanning raw text. For example, without limitation, the aggregation engine 124 may enforce idempotency by hashing the prompt identifier, the profile identifier, and the response body and skipping writes on hash collisions, may apply rate controls per user device 118 to manage bursts, and may surface per-prompt completion tallies so that subsequent modules can determine when a quorum of registered responses 126 has been reached for the first prompt 106.

With continued reference to FIG. 1, in an embodiment, the responses 126 received by the aggregation engine 124 may include individual perspectives collected through prompts 108 presented to participants. For example, without limitation, a response may include a narrative statement from a participant describing the company's long-term competitive advantage. In another example, without limitation, a response may include enumerated goals such as expansion into new markets, cost reduction initiatives, product innovation priorities, and the like. In another example, without limitation, a response may include identified challenges such as supply chain constraints, regulatory risks, talent shortages, and the like. Each response may be registered with metadata 130 from the user profile 120, such as the participant's role, title, or department, thereby contextualizing the perspective within the broader dataset. In an embodiment, once the plurality of responses 126 are registered, the aggregation engine 124 may pool all responses 126 into a common dataset and apply a higher-order aggregation prompt across the corpus. For example, without limitation, the engine may apply semantic clustering to identify themes consistently shared across participants, thereby indicating areas of alignment such as agreement on strategic priorities. For example, without limitation, the engine may also detect areas of misalignment by flagging contradictory perspectives, such as divergent views on whether to prioritize growth or cost containment. For example, without limitation, the engine may further identify critical issues for discussion by detecting gaps in coverage, conflicting objectives, or perspectives that suggest unresolved risks. In an embodiment, the aggregation engine 124 may then generate synthesized outputs 144 in the form of an executive-level summary. For example, without limitation, the summary may highlight shared goals that form a foundation for consensus, misaligned viewpoints that require targeted dialogue, and key issues that merit escalation to decision-makers. In practice, this structured aggregation may enable insights that would traditionally emerge only after extended workshops or consulting engagements to be produced in a matter of hours.

With continued reference to FIG. 1, the at least a processor 102 may be further configured to weigh the plurality of responses 126 as a function of the metadata 130 associated with the user 132 using one or more weighted metrics 134. As used in this disclosure, a "weighted metric" is a quantitative or qualitative measure applied by the apparatus to adjust the relative significance of a response as a function of metadata 130 associated with a user 132. In a non-limiting example, a weighted metric may include a role-based factor such as executive, manager, staff member, and the like. In another non-limiting example, a weighted metric may include a coherence score reflecting how closely a response aligns with previously established themes, categories, goals, and the like. In another non-limiting example, a weighted metric may include an expertise indicator derived from a user profile 120, such as years of experience, certification status, subject-matter specialization, and the like. In a further non-limiting example, a weighted metric may include contextual parameters such as response timeliness, participation frequency, device reliability, and the like.

With continued reference to FIG. 1, in a non-limiting example, the processor 102 may weigh a plurality of responses 126 by first joining each response to user profile 120 metadata 130 and computing a set of weighted metrics 134 that adjust the response's significance as a function of that metadata 130. The processor 102 may derive a role-based factor from the user profile 120, for example executive 1.50, manager 1.20, staff member 1.00, contractor 0.90, and the like. The processor 102 may further derive an expertise factor from indicators such as years of experience, certification status, subject-matter specialization, publication count, and the like, mapped to a score between zero and one. The processor 102 may also compute a coherence score that reflects similarity between the response and previously identified themes, categories, goals, and the like, using semantic embeddings 148 and cosine similarity normalized between zero and one. The processor 102 may additionally determine a timeliness factor derived from the latency between prompt issuance and response receipt, for example immediate 1.00, same day 0.95, next day 0.90, delayed 0.80, and the like. The processor 102 may then combine these factors into a single response weight by applying a configurable rule, such as multiplying the factors together or applying a weighted average, and the like. In a non-limiting example, consider four responses 126 to the same prompt from an executive, a manager, a staff member, and a contractor, each registered with their respective profiles. The executive's response may receive role 1.50, expertise 0.95, coherence 0.92, timeliness 1.00. The manager's response may receive role 1.20, expertise 0.80, coherence 0.88, timeliness 0.95. The staff member's response may receive role 1.00, expertise 0.70, coherence 0.90, timeliness 0.95. The contractor's response may receive role 0.90, expertise 0.85, coherence 0.60, timeliness 0.90, and the like. The processor 102 may compute a preliminary weight 140 for each response by combining its factors, and then normalize the four preliminary weights across all responses 126 using division by the sum of weights. This normalization may yield per-response weights that sum to one, which may then be persisted alongside response identifiers and profile identifiers for downstream aggregation. In a non-limiting example, the processor 102 may refine weights by adding participation quality metrics such as completeness of answer, language clarity measured by readability indices, novelty measured by distance from existing clusters, and the like. These additional metrics may be scaled to zero to one and combined with the existing factors. The processor 102 may enforce guardrails such as a maximum cap and a minimum floor to prevent any single factor from dominating. The processor 102 may also apply role caps per policy, reweight responses 126 within subgroups such as department, location, seniority, and the like, and snapshot the final weights with versioned parameter sets to support audit and replay. In a non-limiting example, the resulting weights may be used by subsequent modules to compute cluster centroids as weighted means of embeddings, to rank key statements by weighted frequency, to compute alignment scores by weighted agreement, and the like.

With continued reference to FIG. 1, weighing the plurality of responses 126 may include classifying the plurality of responses 126 based on a role-based weight 136 of the one or more weighted metrics 134, determining a coherence datum 138 of the one or more weighted metrics 134 of each response, and assigning a weight 140 to each response as a function of the coherence datum 138 and the role-based weight 136. As used in this disclosure, a "role-based weight" is a numerical factor derived from the role or position of a user 132 as indicated in the user profile 120, the factor being applied to adjust the relative significance of that user's response. In a non-limiting example, a role-based weight 136 may assign higher values to senior positions such as executive 1.50, middle values to management roles such as manager 1.20, baseline values to general staff such as 1.00, and lower values to temporary or contractor roles such as 0.90, and the like. In another non-limiting example, role-based weights 136 may also reflect domain-specific expertise such as engineering lead 1.40, compliance officer 1.30, marketing associate 1.00, and the like. As used in this disclosure, a "coherence datum" is a measure that reflects the degree of alignment between a response and one or more established themes, categories, or objectives. In a non-limiting example, a coherence datum 138 may be calculated as a similarity score between the semantic embedding of a response and the centroid of a cluster of related responses 126, with a resulting value between zero and one. In another non-limiting example, a coherence datum 138 may reflect consistency of terminology across responses 126, alignment with previously stated organizational goals, or thematic overlap with other clustered responses 126, and the like. As used in this disclosure, a "weight" is the final numerical value assigned to a response after combining one or more weighted metrics 134, including the role-based weight 136 and the coherence datum 138. In a non-limiting example, a weight 140 may be computed by multiplying the role-based weight 136 with the coherence datum 138 to reflect both the influence of the user's role and the degree of thematic alignment. In another non-limiting example, a weight 140 may be computed by combining additional factors such as expertise, timeliness, completeness of the response, and the like, to form a more comprehensive scoring system. In an embodiment, a response from an executive may receive a role-based weight 136 of 1.50 and a coherence datum 138 of 0.92, resulting in a combined weight of 1.38. In another example, without limitation, a response from a manager may receive a role-based weight 136 of 1.20 and a coherence datum 138 of 0.85, resulting in a combined weight of 1.02. In another example, without limitation, a response from a staff member may receive a role-based weight 136 of 1.00 and a coherence datum 138 of 0.90, resulting in a combined weight of 0.90. In another example, without limitation, a response from a contractor may receive a role-based weight 136 of 0.90 and a coherence datum 138 of 0.60, resulting in a combined weight of 0.54, and the like. These combined weights may then be normalized across all responses 126, enabling the aggregation engine 124 to consistently compare and aggregate inputs from diverse roles while preserving both role significance and thematic coherence.

Still referring to FIG. 1, processor 102 is configured to generate a synthesized output 142 of one or more synthesized outputs 144 based on the aggregated plurality of responses 126. As used in this disclosure, a "synthesized output" is a generated result produced by the apparatus 100 that integrates, consolidates, or otherwise combines a plurality of responses 126 into a coherent representation suitable for analysis, interpretation, or decision-making. In a non-limiting example, the synthesized output 142 may include a textual summary highlighting areas of alignment, misalignment, and critical issues for discussion, and the like. In another non-limiting example, the synthesized output 142 may include structured data such as tables, charts, or matrices that quantify response patterns, weight 140 distributions, thematic clusters, and the like. In another non-limiting example, the synthesized output 142 may include strategy statements 158, recommendations, prioritized objectives, and the like derived from aggregated inputs. In an embodiment, the synthesized output 142 may be generated using a rules-based system in which the processor 102 applies predefined logic to merge responses 126, such as majority voting, weighted averaging, frequency counts, and the like. In another embodiment, the synthesized output 142 may be generated using statistical analysis, such as clustering algorithms, correlation analysis, regression modeling, principal component analysis, and the like, to identify themes and produce a structured representation of the responses 126. As used in this disclosure, "clustering algorithms" are computational methods that group responses 126 into clusters based on similarity measures without requiring predefined labels. In a non-limiting example, clustering algorithms may include k-means clustering used to partition responses 126 into k groups based on semantic embedding distances. In another non-limiting example, clustering algorithms may include hierarchical clustering used to build a tree structure showing relationships among responses 126 at multiple levels of granularity. In another non-limiting example, clustering algorithms may include density-based clustering such as DBSCAN used to identify groups of closely related responses 126 and detect outliers, and the like. As used in this disclosure, "correlation analysis" is a statistical method for measuring the degree to which two or more variables are related across the plurality of responses 126. In a non-limiting example, correlation analysis may identify that responses 126 emphasizing cost reduction are positively correlated with responses 126 emphasizing automation. In another non-limiting example, correlation analysis may identify negative correlations such as responses 126 prioritizing growth being inversely related to responses 126 prioritizing risk avoidance. In another non-limiting example, correlation analysis may be used to quantify strength of relationships across departments, roles, and the like. As used in this disclosure, "regression modeling" is a statistical method for estimating relationships among variables by fitting a mathematical function to the plurality of responses 126. In a non-limiting example, regression modeling may include linear regression used to predict how strongly user role or expertise influences the weight 140 of a response. In another non-limiting example, regression modeling may include logistic regression used to classify responses 126 into categories such as aligned versus misaligned with target data 114. In another non-limiting example, regression modeling may include multivariate regression used to account for multiple factors such as role, timeliness, coherence simultaneously, and the like. As used in this disclosure, "principal component analysis" is a dimensionality reduction technique that transforms a high-dimensional dataset of responses 126 into a smaller set of components while preserving variance. In a non-limiting example, principal component analysis may reduce hundreds of response features into a handful of principal components that represent common underlying themes. In another non-limiting example, principal component analysis may be used to visualize responses 126 in two or three dimensions, making thematic patterns more interpretable. In another non-limiting example, principal component analysis may highlight which response features contribute most to differences among participants, and the like. In another embodiment, the synthesized output 142 may be generated using machine learning or natural language processing techniques, such as generating semantic embeddings 148, clustering embeddings into thematic groups 150, and prompting a large language model 146 to produce natural-language summaries, and the like. In a non-limiting example, the processor 102 may generate semantic embeddings 148 of the plurality of responses 126. This may include applying a pre-trained neural network model such as a transformer encoder that converts each response into a numerical vector in high-dimensional space. For example, without limitation, two responses 126 that use different wording but express similar ideas may produce embeddings that are mathematically close to one another. In another example, without limitation, embeddings may be fine-tuned on domain-specific data such as industry terminology or organizational jargon so that the representations capture nuances relevant to the entity 110. In a further example, embeddings may be stored in a vector database that allows efficient similarity search across thousands of responses 126, and the like. In a non-limiting example, the processor 102 may cluster the semantic embeddings 148 into thematic groups 150 by applying unsupervised algorithms. For example, without limitation, k-means clustering may assign each embedding to one of k groups, thereby partitioning responses 126 into distinct themes. In another example, without limitation, hierarchical clustering may build a tree structure of embeddings that reveals broad themes at higher levels and more specific sub-themes at lower levels. In another example, without limitation, density-based clustering such as DBSCAN may detect groups of closely related responses 126 and identify outlier responses 126 that do not belong to any group, and the like. The output of this stage may include thematic clusters, each associated with representative embeddings and response identifiers. In a non-limiting example, once clusters are formed, the processor 102 may identify cluster representatives 156 by selecting the centroid embedding, the most central response, or a set of high-weight responses 126 from each cluster. For example, without limitation, a cluster about "cost reduction" may be represented by a centroid vector and a handful of responses 126 that were closest to that centroid. In another example, without limitation, keywords may be extracted from the cluster to serve as concise thematic labels, and the like. In a non-limiting example, the processor 102 may prompt a large language model 146 with the cluster representatives 156, metadata 130 such as role-based weights 136, coherence scores, and alignment metrics 154, and the like, in order to generate natural-language summaries. For example, without limitation, the large language model 146 may generate a paragraph summary that describes what participants agreed upon within a cluster. In another example, without limitation, the model may generate a contrasting summary that identifies disagreements or misalignments across clusters. In another example, without limitation, the model may generate outputs in different forms such as executive summaries, bullet-point lists of key issues, or structured strategy statements 158, and the like. In an embodiment, the system may consolidate the outputs from the large language model 146 into one or more synthesized outputs 144. For example, without limitation, the synthesized output 142 may include a dashboard that shows thematic clusters, their weighted importance, and representative summaries. In another example, without limitation, the synthesized output 142 may include a ranked list of strategic priorities derived from aggregated responses 126. In another example, without limitation, the synthesized output 142 may include narrative reports that highlight alignment, misalignment, and open issues requiring further discussion, and the like. In a further embodiment, the synthesized output 142 may be generated through iterative prompting in which initial synthesized outputs 144 are refined by incorporating additional responses 126, updated weights, or feedback 172 from users, and the like.

With continued reference to FIG. 1, the at least a processor 102 may be further configured to generate, using a large language model 146, the one or more synthesized outputs 144 by computing semantic embeddings 148 of the plurality of responses 126, clustering the semantic embeddings 148, identifying thematic groups 150 based on clustered semantic embeddings 152, calculating alignment metrics 154 across the thematic groups 150 as a function of the one or more weighted metrics 134, and prompting the large language model 146 with cluster representatives 156 and metrics to generate the synthesized output 142. A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, textbooks, research papers, technical manuals, news articles, social media posts, open-source code repositories, conversational transcripts, and the like. In some embodiments, training sets may include a variety of subject matters relevant to organizational alignment and strategic synthesis, such as, non-limiting examples, corporate strategy documents, organizational goal statements, annual reports, business planning materials, leadership communications, meeting transcripts, survey responses 126, employee feedback records, industry analyses, and the like. In some embodiments, training sets of an LLM may include information from one or more public or private databases. As a non-limiting example, training sets may include databases associated with an entity 110. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on the capability needed such as generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, without limitation, if several participants have already provided responses 126 such as "expand into new markets" and "international growth," then it may be highly likely that related terms such as "global strategy," "foreign partnerships," or "cross-border operations," and the like, will emerge as subsequent inputs or themes during aggregation. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

With continued reference to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

With continued reference to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device 118. User device 118 may be any computing device that is used by a user 132. As non-limiting examples, a user device 118 may include desktops, laptops, smartphones, tablets, and the like. In some embodiments, input may include any set of data associated with a participant's response to an interview prompt, such as a typed statement of strategic priorities, a spoken description of organizational challenges, a multiple-choice selection of long-term goals, or an uploaded document containing supporting evidence, and the like.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, as used in this disclosure, "semantic embeddings" are numerical vector representations of responses 126 generated by machine learning models, wherein each vector encodes the semantic meaning of the corresponding text. In a non-limiting example, semantic embeddings 148 may map two responses 126 such as "expand into new markets" and "international growth" close together in vector space because they express related ideas. In another non-limiting example, semantic embeddings 148 may distinguish "cost reduction" from "innovation strategy" by placing them far apart in the embedding space, and the like. As used in this disclosure, "thematic groups" are clusters of responses 126 that share semantic similarity, wherein each group reflects a common theme, idea, or category derived from the responses 126. In a non-limiting example, a thematic group may represent cost-focused strategies, such as "cut operating expenses," "optimize supply chain," "reduce overhead," and the like. In another non-limiting example, a thematic group may represent growth-focused strategies, such as "new product launches," "international expansion," "strategic partnerships," and the like. As used in this disclosure, "clustered semantic embeddings" are collections of semantic embeddings 148 that have been grouped together by a clustering algorithm according to similarity measures. In a non-limiting example, clustered semantic embeddings 152 may be produced using k-means clustering, where embeddings corresponding to growth-related responses 126 form one cluster and embeddings corresponding to risk-related responses 126 form another cluster. In another non-limiting example, clustered semantic embeddings 152 may be produced using hierarchical clustering to show broader and narrower categories of strategic themes, and the like. As used in this disclosure, "alignment metrics" are quantitative measures that indicate the degree of agreement, consistency, or divergence among thematic groups 150 or responses 126. In a non-limiting example, alignment metrics 154 may calculate the proportion of participants whose responses 126 fall into the same thematic group. In another non-limiting example, alignment metrics 154 may measure semantic overlap between groups by computing similarity scores across centroids. In another non-limiting example, alignment metrics 154 may incorporate weighted factors such as role-based weight 136 or coherence datum 138 to adjust the strength of agreement, and the like. As used in this disclosure, "cluster representatives" are selected data elements that summarize or characterize the content of a thematic group and are used to prompt a large language model 146. In a non-limiting example, a cluster representative may be the centroid embedding of a thematic group. In another non-limiting example, a cluster representative may be a high-weight response selected from within the cluster based on role-based weight 136, coherence datum 138, or expertise, and the like. In another non-limiting example, a cluster representative may include a generated keyword set or short label such as "cost optimization" or "global expansion," and the like.

With continued reference to FIG. 1, in a non-limiting example, the processor 102 may compute semantic embeddings 148 of the plurality of responses 126 by applying a neural encoder that maps each response to a numerical vector. For example, without limitation, responses 126 such as "expand into new markets" and "pursue international growth" may be mapped to vectors that are close together in the embedding space, while responses 126 such as "reduce operational costs" or "optimize supply chain" may be mapped farther away, and the like. In a non-limiting example, the processor 102 may cluster the embeddings into groups that reflect thematic similarity. For example, without limitation, embeddings representing "cut expenses," "lower headcount," and "streamline processes" may be clustered into a cost-reduction theme, while embeddings representing "launch new product lines," "invest in innovation," and "grow into foreign markets" may be clustered into a growth theme, and the like. In a non-limiting example, the processor 102 may identify thematic groups 150 by labeling clusters with representative keywords or concepts. For example, without limitation, one thematic group may be labeled "cost optimization," another may be labeled "growth and expansion," and another may be labeled "talent and workforce challenges," and the like. In a non-limiting example, the processor 102 may calculate alignment metrics 154 across thematic groups 150 by analyzing weighted participation. For example, without limitation, an alignment metric may show that 80% of executive-weighted responses 126 align with "global expansion," 65% of manager-weighted responses 126 align with "cost optimization," and 40% of staff-weighted responses 126 align with "talent challenges," and the like. In another non-limiting example, alignment metrics 154 may also reveal divergence, such as executives prioritizing growth while staff emphasize operational risk, and the like. In a non-limiting example, the processor 102 may select cluster representatives 156 such as centroid embeddings, high-weight responses 126, or keyword summaries for each thematic group and use these as inputs to prompt a large language model 146. For example, without limitation, the prompt may provide the large language model 146 with "Cluster 1: Cost Optimization-cut expenses, streamline supply chain, reduce headcount," "Cluster 2: Growth and Expansion-launch new product lines, pursue international markets, invest in innovation," and "Cluster 3: Talent Challenges-employee retention, training programs, skill gaps," along with alignment metrics 154. The large language model 146 may then generate a synthesized output 142 that describes shared goals, highlights areas of disagreement, and produces a consolidated strategy statement, and the like. In a non-limiting example, the synthesized output 142 may be an executive-level summary stating that "participants largely agree on the need for global expansion, but there is division between cost reduction and innovation priorities, with unresolved concerns around workforce capability," and the like.

With continued reference to FIG. 1, the synthesized output 142 may include one or more strategy statements 158. As used in this disclosure, a "strategy statement" is a synthesized output 142 generated by the apparatus 100 that expresses an articulated direction, priority, or objective derived from aggregated responses 126 of multiple participants. A strategy statement may be presented in natural language form, structured text, or other machine-readable formats, and may reflect consensus, highlight divergence, or propose actions for organizational alignment. In a non-limiting example, a strategy statement may read, "The organization should prioritize expansion into international markets to strengthen its long-term competitive advantage," and the like. In another non-limiting example, a strategy statement may read, "Operational efficiency should be improved by reducing overhead costs, optimizing supply chain logistics, and automating routine processes," and the like. In another non-limiting example, a strategy statement may read, "Innovation should be advanced by investing in research and development, launching new product lines, and fostering a culture of creativity," and the like. In a further non-limiting example, a strategy statement may read, "Talent challenges should be addressed by improving employee retention, enhancing training programs, and developing skill-building initiatives," and the like.

With continued reference to FIG. 1, the at least a processor 102 may be further configured to generate a second prompt 160 of the plurality of prompts 108 as a function of the plurality of responses 126 and the synthesized output 142, transmit the second prompt 160 to the plurality of user devices 116, aggregate a plurality of second responses 162 to the second prompt 160, weigh the plurality of second responses 162, and generate a second synthesized output 164 of the one or more synthesized outputs 144. As used in this disclosure, a "second prompt" is a follow-up inquiry generated by the processor 102. Without limitation, the second prompt 160 may be based on the aggregated plurality of responses 126 and the synthesized output 142. Without limitation, the second prompt 160 may be designed to refine, clarify, or expand upon prior inputs. In a non-limiting example, the second prompt 160 may ask participants, "Given that most responses emphasize international growth, what specific markets should be prioritized?" and the like. In another non-limiting example, the second prompt 160 may read, "Several responses highlighted workforce challenges-how should training programs be structured to address these gaps?" and the like. As used in this disclosure, a "second response" is an input provided by a participant in reply to the second prompt 160. In an embodiment, the second response may be transmitted using a user device 118, and registered with metadata 130 in the same manner as the initial responses 126. In a non-limiting example, a second response may specify, "The Asia-Pacific region should be prioritized for expansion due to strong demand," and the like. In another non-limiting example, a second response may state, "Training should focus on digital skills and leadership development," and the like. In another non-limiting example, a second response may identify risks such as, "Expanding too quickly into new regions may overextend resources," and the like. As used in this disclosure, a "second synthesized output" is a refined or updated consolidated result produced by the processor 102 based on the aggregation and weighting of the second responses 162. Without limitation, the second synthesized output 164 may build on and/or enhance the initial synthesized output 142. In a non-limiting example, the second synthesized output 164 may provide an updated executive-level summary such as, "Participants broadly agree on prioritizing Asia-Pacific for expansion, with emphasis on digital upskilling to support growth," and the like. In another non-limiting example, the second synthesized output 164 may highlight continuing divergence such as, "While executives prioritize expansion, staff responses 126 caution against resource strain and recommend phased entry," and the like. In another non-limiting example, the second synthesized output 164 may propose strategic adjustments such as, "Investment in work-force training should be accelerated before pursuing aggres-sive international expansion," and the like.

With continued reference to FIG. 1, the at least a proces-sor 102 may be further configured to display, using the user interface 128 of each user device 118, a visualization 166 of the plurality of prompts 108 to the user 132, wherein the visualization 166 comprises text data 168 and graphical data 170. As used in this disclosure, a "visualization" is a display generated by the apparatus 100 that presents the plurality of prompts 108, responses 126, or synthesized outputs 144 in a format suitable for user interpretation, interaction, or analysis. In a non-limiting example, a visualization 166 may include an interactive dashboard that shows prompts 108 alongside aggregated responses 126. In another non-limiting example, a visualization 166 may present summaries of thematic groups 150 in side-by-side panels, and the like. As used in this disclosure, "text data" is alphanumeric content displayed within a visualization 166 that conveys prompts 108, responses 126, summaries, or related narrative infor-mation. In a non-limiting example, text data 168 may include the verbatim wording of prompts 108 sent to par-ticipants. In another non-limiting example, text data 168 may include synthesized strategy statements 158 or execu-tive-level summaries. In another non-limiting example, text data 168 may include participant response excerpts such as "expand into new markets" or "reduce operational costs," and the like. As used in this disclosure, "graphical data" is visual content displayed within a visualization 166 that conveys relationships, distributions, or metrics derived from prompts 108 and responses 126. In a non-limiting example, graphical data 170 may include bar charts showing response frequencies by theme. In another non-limiting example, graphical data 170 may include pie charts indicating the proportion of participants aligned with each strategic prior-ity. In another non-limiting example, graphical data 170 may include heatmaps of thematic clusters, line graphs showing alignment trends over iterative prompts 174, or network diagrams mapping relationships between responses 126, and the like. In an embodiment, the processor 102 may display a visualization 166 in which the left panel contains text data 168 such as the current prompt and key response excerpts, while the right panel contains graphical data 170 such as a pie chart showing the distribution of responses 126 by thematic group. In another embodiment, the processor 102 may generate a time-series visualization 166 where text data 168 lists the evolution of strategy statements 158 across iterative prompts 174, while graphical data 170 shows a line chart of alignment metrics 154 increasing or decreasing over time. In another embodiment, the processor 102 may display a hierarchical visualization 166 where text data labels each thematic group, and graphical data 170 shows a tree diagram linking subthemes such as "growth," "cost optimization," and "talent challenges," and the like.

With continued reference to FIG. 1, in an embodiment, the processor 102 may render a baseline visualization 166 for all users that presents the plurality of prompts 108, aggregated themes, and alignment metrics 154 in a common layout, thereby ensuring a consistent frame of reference across the organization. In a non-limiting example, the baseline visu-alization 166 may display the current prompt, exemplar responses 126, thematic group labels, and a summary align-ment indicator, and the like. In an embodiment, the proces-sor 102 may personalize the visualization 166 per user by applying user profile 120 settings that govern language, permissions, and presentation preferences. In a non-limiting example, the visualization 166 may be localized according to the user's preferred language, number and date formats, and reading direction, and the like. In a non-limiting example, the visualization 166 may hide or reveal sensitive segments based on access level so that executive-only metrics are omitted for staff viewers, and the like. In a non-limiting example, the visualization 166 may adapt lay-out density and font size to match accessibility preferences such as larger text or high-contrast mode, and the like. In an embodiment, role-based settings in the user profile 120 may determine which graphical data 170 and text data 168 appear and at what level of granularity. In a non-limiting example, an executive viewer may receive a condensed dashboard with top-level alignment percentages and strategy state-ments 158 while a manager viewer may receive drill-down controls to inspect department-level clusters and response distributions, and the like. In a non-limiting example, a staff viewer may see anonymized excerpts and aggregate charts without identifiers while an administrator viewer may see audit trails and processing states, and the like. In an embodi-ment, the processor 102 may vary interaction affordances according to user profile capabilities, enabling some users to explore clusters while others view read-only summaries. In a non-limiting example, a power user may be offered filters to recompute on-the-fly views by role, location, or time window while a casual user may be presented with fixed snapshots and guided highlights, and the like. In a non-limiting example, the visualization 166 may expose per-user bookmarks, saved views, or notification panels when the profile indicates advanced workflows, and the like. In an embodiment, the processor 102 may tailor the sequence and emphasis of elements in the visualization 166 based on profile-driven priorities. In a non-limiting example, product leaders may see innovation-related thematic groups 150 pinned to the top of the view while finance leaders may see cost-optimization clusters emphasized first, and the like. In a non-limiting example, the visualization 166 may re-order charts to foreground misalignment indicators for facilitators while foregrounding consensus summaries for executives, and the like. In an embodiment, device-specific attributes recorded in the user profile 120 may steer responsive layout and asset selection. In a non-limiting example, a smartphone user may receive a single-column, tap-first visualization 166 with progressive disclosure of charts while a desktop user may receive a multi-panel layout with simultaneous text and graphics, and the like. In a non-limiting example, a low-bandwidth profile setting may trigger simplified charts and deferred loading of high-resolution assets, and the like. In an embodiment, privacy and compliance flags in the user profile 120 may control masking, aggregation thresholds, and anonymization within the visualization 166. In a non-limiting example, the processor 102 may suppress display of clusters with fewer than a threshold number of responses 126 for certain viewers to prevent re-identification, and the like. In a non-limiting example, the processor 102 may redact response excerpts to role-neutral language for viewers without clearance, and the like. In an embodiment, experi-mentation and feature flags attached to the user profile 120 may yield intentionally different visualizations to evaluate effectiveness while preserving consistent underlying data. In a non-limiting example, one cohort may receive a chord diagram of inter-theme relationships while another cohort receives a matrix heatmap of the same relationships, and the like. In a non-limiting example, one cohort may view ranked lists of strategy statements 158 while another cohort views narrative paragraphs, and the like. In an embodiment, the processor 102 may also support identical visualizations across users by applying uniform profile templates. In a non-limiting example, a facilitation session may lock all viewers to a standard layout and content set to keep discussion synchronized, and the like. In a non-limiting example, regulatory review may require a fixed visualization 166 with preapproved fields for all reviewers regardless of role, and the like. In an embodiment, these variations may be realized by a policy-driven rendering pipeline that evaluates user profile attributes before composing text data 168 and graphical data 170 for display. In a non-limiting example, the pipeline may read profile keys such as role, permissions, language, device class, accessibility flags, and experiment assignment, then select template fragments, chart specifications, and data slices accordingly, and the like. In a non-limiting example, the pipeline may emit a declarative view definition that the client uses to render the final visualization 166 consistently across devices while honoring per-user differences, and the like.

With continued reference to FIG. 1, the at least a processor 102 may be further configured to receive feedback 172 associated with the first prompt 106 and generate the second prompt 160 based on the feedback 172. As used in this disclosure, "feedback" is evaluative or clarifying information received by the apparatus 100. Without limitation, feedback 172 may be received from one or more users, user devices 116, or system modules. Without limitation, the feedback 172 may include information that relates to the first prompt 106, its associated responses 126, or the synthesized output 142 derived therefrom. Feedback 172 may be explicit, such as direct commentary or ratings provided by participants, or implicit, such as behavioral signals collected by the system, and the like. In a non-limiting example, feedback 172 may be received from participants who answered the first prompt 106, including executives, managers, staff members, contractors, and the like. In another non-limiting example, feedback 172 may be provided by facilitators or administrators monitoring the process. In another non-limiting example, feedback 172 may originate from the aggregation engine 124 itself in the form of confidence scores or model uncertainty, and the like. In a non-limiting example, feedback 172 may include textual comments such as, "The question was too broad" or "The synthesized output misses regulatory risks," and the like. In another non-limiting example, feedback 172 may include structured ratings such as a five-star clarity score or a binary agree/disagree marker. In another non-limiting example, feedback 172 may include metadata 130 such as skipped questions, time taken to respond, or the use of clarification requests, and the like. In a non-limiting example, feedback 172 may be received directly through the user interface 128 of the user device 118, such as a web form, mobile application, or chat interface, and the like. In another non-limiting example, feedback 172 may be received through secondary communication channels such as email responses 126, survey links, or integrated collaboration platforms, and the like. In another non-limiting example, feedback 172 may be automatically logged by backend systems during response registration, and the like. In a non-limiting example, feedback 172 may be received immediately after a user 132 submits a first response. In another non-limiting example, feedback 172 may be received after review of the synthesized output 142. In another non-limiting example, feedback 172 may be received asynchronously hours or days later, as part of follow-up evaluation, and the like. In a non-limiting example, feedback 172 may be entered manually as text or numerical ratings. In another non-limiting example, feedback 172 may be inferred through behavioral logging such as repeated re-reading of the synthesized output 142 or abandoning an input form. In another non-limiting example, feedback 172 may be submitted via embedded controls such as "Request clarification" buttons, sliders, checkboxes, or speech input, and the like. In an embodiment, the processor 102 may analyze feedback 172 to adjust the content, scope, or phrasing of the second prompt 160. In a non-limiting example, if multiple users comment that the first prompt 106 was too broad, the second prompt 160 may narrow focus, such as, "Which three markets should be prioritized for expansion?" and the like. In another non-limiting example, if feedback 172 indicates that the synthesized output 142 overlooked key issues, the second prompt 160 may explicitly request elaboration, such as, "Several responses did not address regulatory risks-what compliance issues should be considered?" and the like. In another non-limiting example, if feedback 172 shows misalignment between roles (e.g., executives emphasize growth while staff emphasize cost reduction), the second prompt 160 may be designed to reconcile divergence, such as, "How can growth priorities be pursued without compromising cost efficiency?" and the like. In an embodiment, the processor 102 may further weigh feedback 172 based on metadata 130, so that higher-weight inputs from executives or subject matter experts exert greater influence on the refinement of the second prompt 160. In a non-limiting example, executive-level feedback 172 may steer the second prompt 160 toward strategic alignment, while staff-level feedback 172 may refine operational feasibility, and the like.

With continued reference to FIG. 1, the at least a processor 102 may be further configured to generate, using the aggregation engine 124, iterative prompts 174 based on the aggregated plurality of responses 126 and the synthesized output 142, transmit the iterative prompts 174 to the plurality of user devices 116, receive updated responses 176 based on the iterative prompts 174, aggregate the updated responses 176, and generate a refined synthesized output 178. As used in this disclosure, an "iterative prompt" is a subsequent inquiry generated by the processor 102 based on previously aggregated responses 126, synthesized outputs 144, and optionally feedback 172, wherein the iterative prompt is designed to refine, challenge, or extend prior discussion. In a non-limiting example, an iterative prompt may state, "Several participants emphasized international expansion while others focused on cost efficiency-how can these priorities be balanced?" and the like. In another non-limiting example, an iterative prompt may probe deeper into a thematic group, such as, "Talent challenges were identified as critical-what specific training initiatives should be prioritized?" and the like. As used in this disclosure, an "updated response" is a new or modified input provided by a user 132 in reply to an iterative prompt, wherein the updated response incorporates reflection on prior outputs or peer perspectives. In a non-limiting example, an updated response may adjust an earlier position by stating, "While I initially prioritized aggressive expansion, I now believe a phased entry into Asia-Pacific would be more sustainable," and the like. In another non-limiting example, an updated response may elaborate on a prior statement, such as, "Cost reduction should include automation of routine tasks, not just workforce cuts," and the like. As used in this disclosure, a "refined synthesized output" is a subsequent consolidated result produced by the processor 102 after aggregating and weighing updated responses 176, wherein the refined synthesized output 178 builds upon the prior synthesized output 142 with improved clarity, specificity, and consensus. In a non-limiting example, a refined synthesized output 178 may read, "Participants now broadly agree to prioritize Asia-Pacific expansion while implementing automation-driven cost optimization," and the like. In another non-limiting example, a refined synthesized output 178 may state, "Consensus has emerged on investing in workforce upskilling programs before scaling international growth," and the like. In another non-limiting example, a refined synthesized output 178 may highlight residual divergence, such as, "Executives continue to favor near-term market entry, while staff advocate for a slower ramp-up," and the like. In an embodiment, the refined synthesized output 178 is configured to drive alignment among the plurality of users by highlighting areas of agreement, resolving or clarifying points of disagreement, and accelerating convergence toward actionable outcomes. In a non-limiting example, the refined synthesized output 178 may transform initial divergent views into a structured action plan that integrates growth, cost, and talent considerations, and the like. In an embodiment, the distinction between a second prompt 160, a second response, and a second synthesized output 164, as compared to an iterative prompt, an updated response, and a refined synthesized output 178, lies in their role and scope within the aggregation process. The second prompt 160 may be understood as the immediate follow-up to the first prompt 106, generated as a function of the initial responses 126 and the first synthesized output, thereby serving as the first structured iteration beyond the initial round of inputs. The second response may be the user input specifically tied to that second prompt 160, reflecting participant perspectives in direct reply to the first cycle's consolidation. The second synthesized output 164 may then be the consolidated result of those second responses 162, representing a structured progression from the first synthesized output. By contrast, iterative prompts 174 may encompass not only the second prompt 160 but also subsequent prompts in an ongoing sequence, wherein each prompt is adaptively generated to refine, clarify, or deepen the discussion across multiple cycles. Updated responses 176 may include not only the second responses 162 but also participant modifications, elaborations, or adjustments made in response to iterative prompts 174 as perspectives evolve. Refined synthesized outputs 178 may represent not just the second synthesized output 164 but any subsequent consolidated results produced across iterative cycles, wherein each refined synthesized output 178 is configured to drive alignment among users and accelerate convergence toward actionable outcomes. In this way, the second prompt 160, second response, and second synthesized output 164 may be understood as a specific early instance within the broader class of iterative prompts 174, updated responses 176, and refined synthesized outputs 178, and the like.

With continued reference to FIG. 1, in an embodiment, the apparatus 100 may represent an improvement over conventional methods of organizational alignment and strategy development by enabling structured, AI-driven synthesis of multiple participant inputs in a fraction of the time traditionally required. Unlike group workshops where discussions are dominated by a few voices or consulting engagements that require weeks or months of manual interviews and analysis, the apparatus 100 may collect, weigh, and aggregate responses 126 systematically, applying role-based weights 136, semantic clustering, and alignment metrics 154 to ensure that insights are contextualized and balanced. In a non-limiting example, this improvement may allow executives to receive an executive-level summary highlighting consensus, divergence, and actionable priorities within hours rather than months, and the like. In an embodiment, the apparatus 100 may further provide an improvement by enhancing equity of participation. Each response may be registered and contextualized by metadata 130, ensuring that the perspectives of staff, managers, and contractors are considered alongside executive viewpoints, rather than being marginalized. In another non-limiting example, this improvement may reduce bias by weighting responses 126 not by personality dominance but by calibrated factors such as expertise, coherence, and timeliness, and the like. In an embodiment, the apparatus 100 may also provide an improvement through its iterative refinement loop, wherein synthesized outputs 144 drive subsequent prompts that elicit clarified or reconciled inputs, thereby accelerating convergence toward alignment. In a non-limiting example, this improvement may yield refined strategy statements 158 that reflect both organizational priorities and participant-level concerns, producing outcomes that are simultaneously strategic, actionable, and widely supported, and the like.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
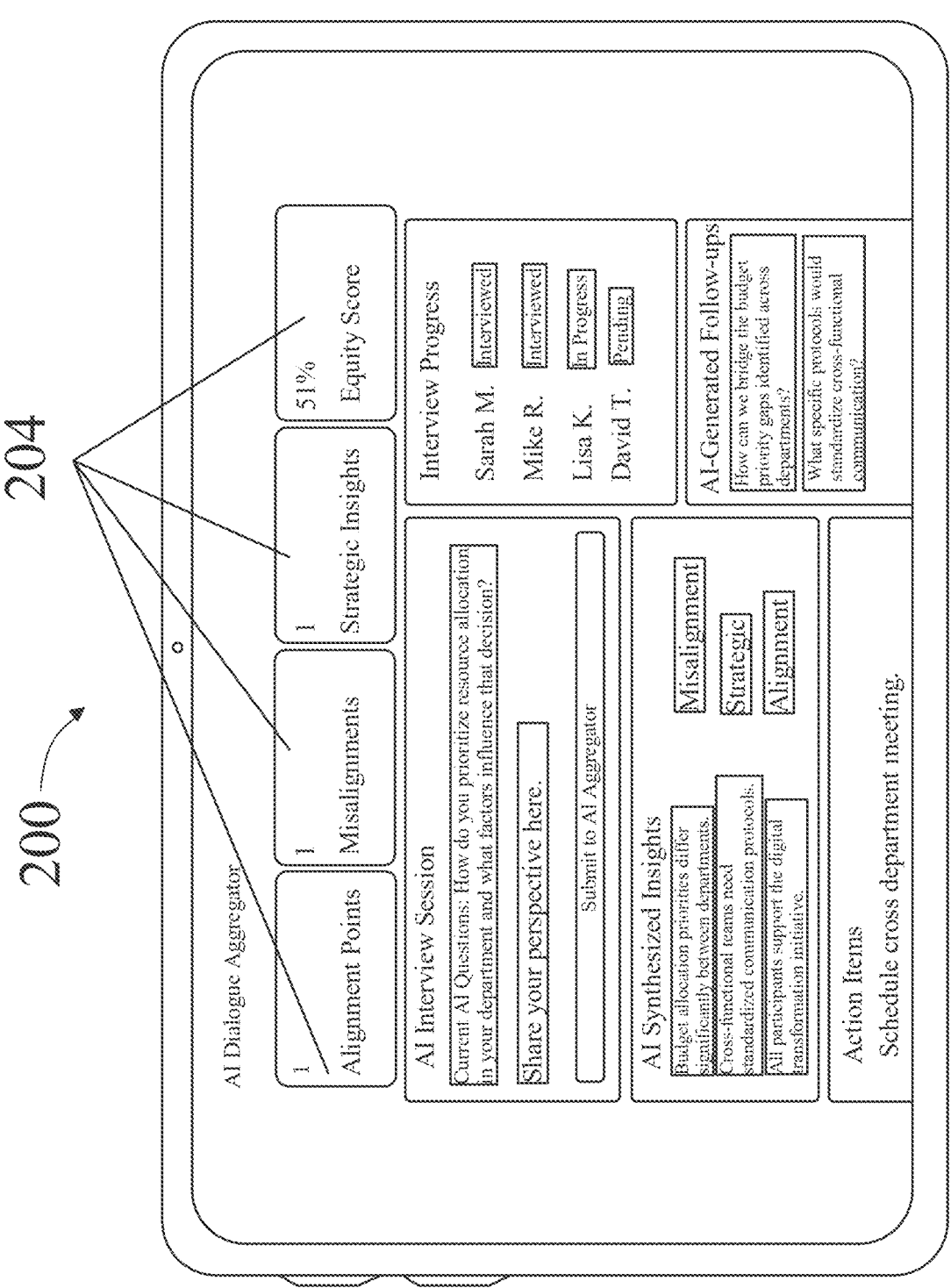
FIG. 2 is an exemplary illustration of a graphical user interface displaying a visualization.

Referring now to FIG. 2, an exemplary illustration 200 of a graphical user interface displaying a visualization. In an embodiment, the visualization may include graphical data 204. In an embodiment, the upper region of the interface may present graphical data 204 such as summary indicators. For example, the graphical data 204 may include alignment points, misalignments, strategic insights, and an equity score, wherein these values provide the user with a high-level overview of the current synthesis state. In an embodiment, the interface may further include an "AI Interview Session" panel, wherein the current AI question is displayed as text data and a text entry field permits a user to submit their perspective through the user device. In an embodiment, the right-hand portion of the interface may display interview progress, wherein the system tracks and renders the status of each participant, such as "interviewed," "in progress," or "pending," and the like. In an embodiment, the lower central region of the interface may display "AI Synthesized Insights," wherein aggregated statements distilled by the aggregation engine are rendered in text form, with interactive tags identifying whether the statement reflects alignment, misalignment, a strategic issue, and the like. In an embodiment, the bottom portion of the interface may include an "Action Items" section configured to provide next steps, such as scheduling follow-up meetings or initiating specific organizational actions. In an embodiment, the lower right-hand portion of the interface may display "AI-Generated Follow-ups," wherein the processor generates iterative prompts designed to deepen discussion or resolve points of divergence. In an embodiment, the graphical layout may be configured to display both text data, such as prompts and synthesized statements, and graphical data, such as progress indicators, tags, and scores, thereby allowing a user to interact with and interpret organizational insights through a unified visualization.

With continued reference to FIG. 2, in an embodiment, the graphical user interface may be configured to adapt the visualization dynamically based on user profile attributes so that the display for an executive, a manager, or a staff member may be the same or different depending on role-based permissions, preferences, and metadata. In an embodiment, an executive user may be presented with a condensed dashboard emphasizing top-level indicators such as alignment points, misalignments, and equity score, accompanied by synthesized insights summarized at the organizational level, and the like. In another embodiment, a manager user may be shown additional details such as department-specific progress indicators, cluster-level themes, or subgroup alignment metrics, thereby enabling drill-down into local areas of responsibility, and the like. In an embodiment, staff users may receive a visualization that prioritizes anonymized excerpts and general thematic summaries rather than role-weighted statistics, thereby maintaining equity and confidentiality. In an embodiment, users with administrative privileges may be provided with expanded visualizations that display processing states, metadata mappings, or audit logs, and the like. In another embodiment, accessibility preferences stored in the user profile, such as high-contrast themes or larger font settings, may drive adjustments to the GUI rendering without altering the underlying content. In an embodiment, the AI-generated follow-up prompts displayed within the interface may also vary per user profile, such that executives may be prompted with higher-level strategic trade-offs, managers with operational clarifications, and staff members with implementation-oriented inquiries, and the like. In this way, the apparatus may improve usability and relevance of the interface while ensuring consistency of underlying data across all roles.

Figure 3:
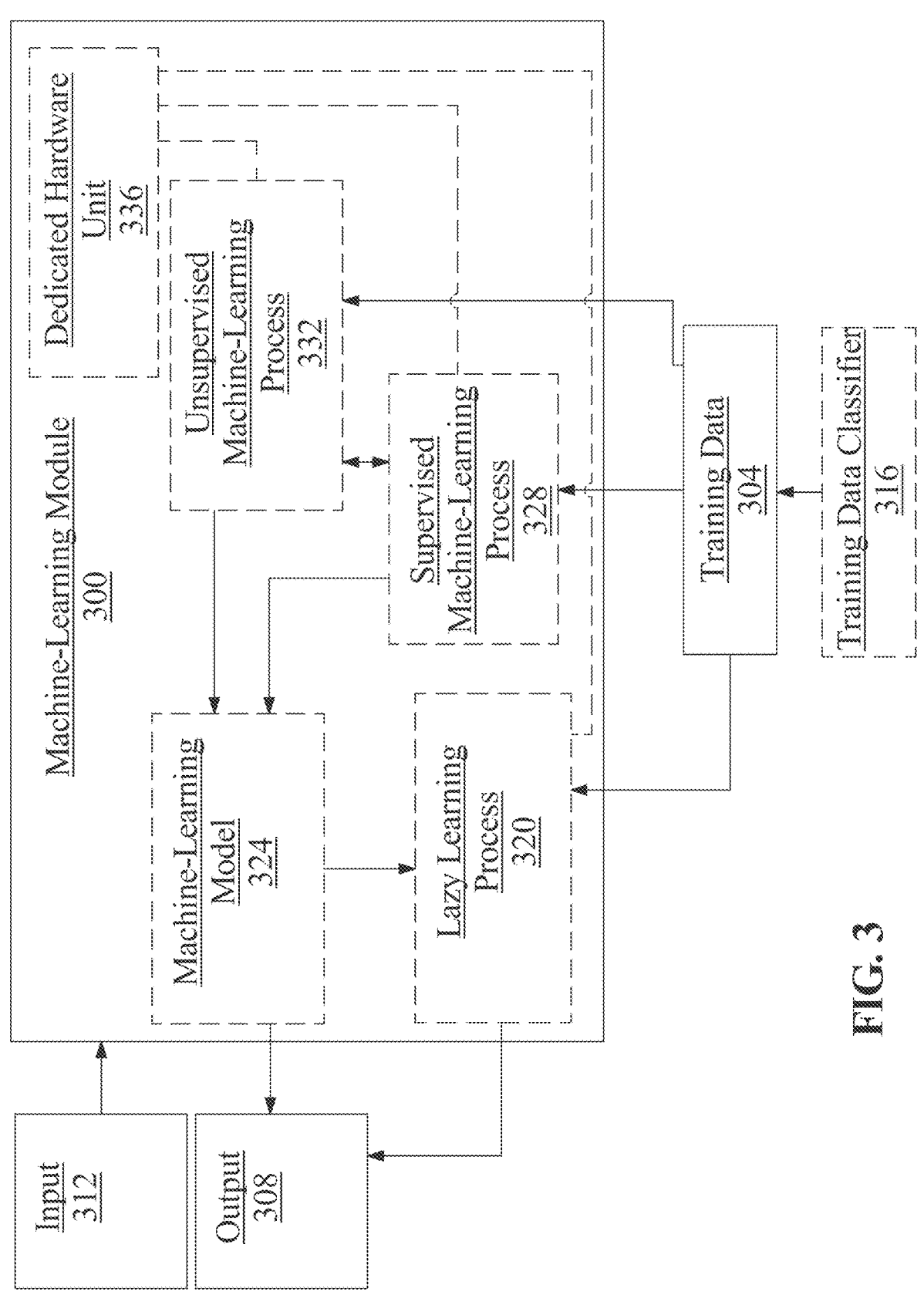
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data

304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, the input data may include prompts generated by the processor, such as "How do you prioritize resource allocation in your department?" as well as responses provided by participants through their respective user devices, such as "Expansion into new markets is the top priority" or "Cost optimization is the most critical factor," and the like. The output data may include one or more synthesized outputs generated by the aggregation engine, such as an executive-level summary highlighting alignment on digital transformation, misalignment on budget priorities, or a consolidated strategy statement emphasizing phased international expansion coupled with cost reduction measures, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to characterize a sub-population, such as a cohort of persons distinguished by organizational role, department, or geographic location, and/or other analyzed items and/or phenomena for which a subset of training data may be selected, such as responses associated with a particular thematic group, prompts associated with a specific strategic domain, or metadata linked to a defined alignment metric, and the like.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where a, is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include prompts and participant responses as described above as inputs, and one or more synthesized outputs such as strategy statements, executive-level summaries, or thematic group labels as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
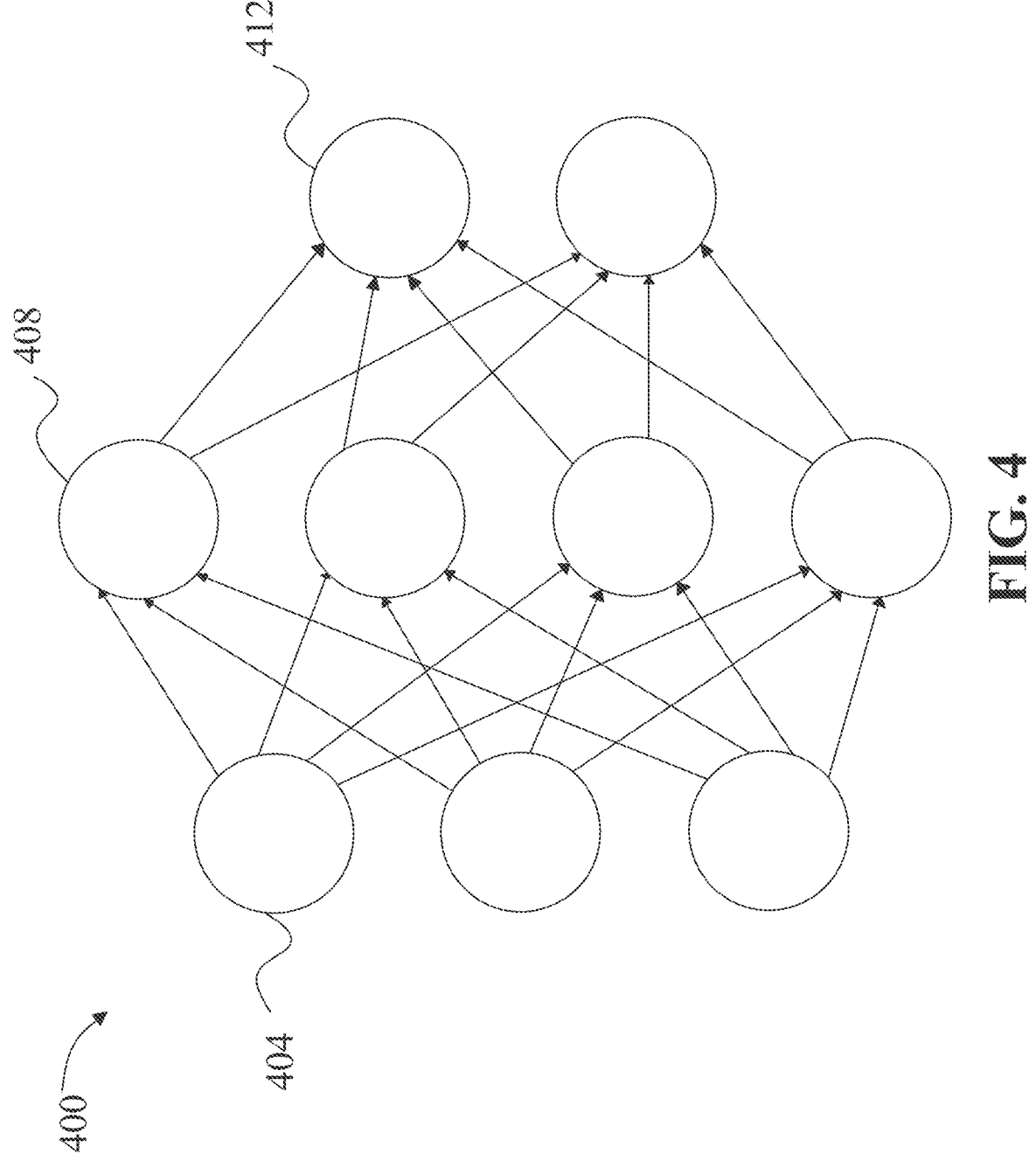
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
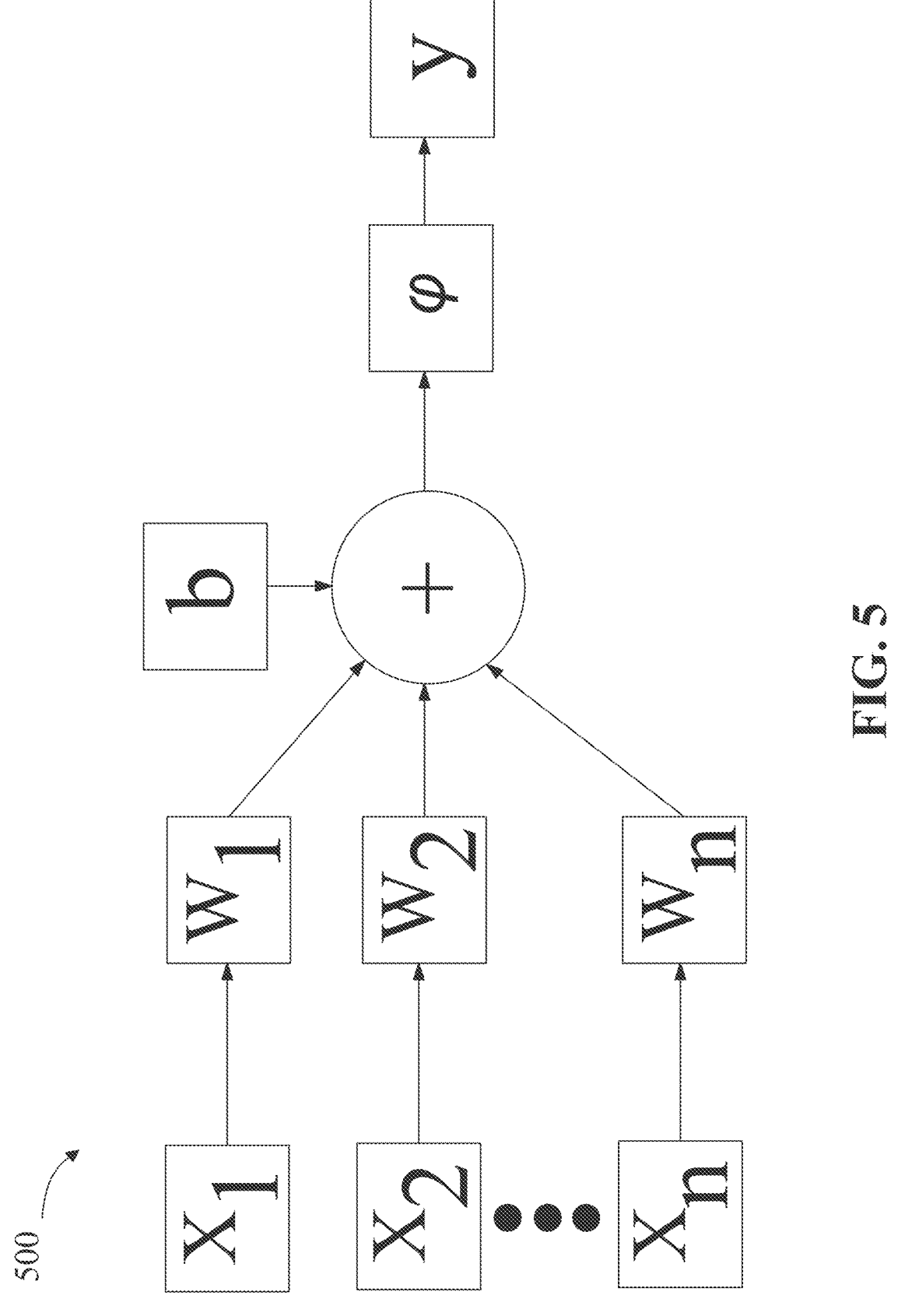
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0,x)$, a "leaky" and/or "parametric" rectified linear unit function such as $f(x) = \max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x \ast \text{sigmoid}(x)$, a Gaussian error linear unit

47 function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 6, a flow diagram of an exemplary method 600 for generating one or more synthesized outputs is illustrated. At step 605, method 600 includes generating, using the at least a processor, a first prompt of a plurality of prompts, wherein the first prompt is associated with an entity. In an embodiment, the plurality of prompts comprise one or more inquiries associated with target data associated with the entity. This may be implemented as described and with reference to FIGS. 1-5.

Still referring to FIG. 6, at step 610, method 600 includes transmitting, using the at least a processor, the first prompt to a plurality of user devices, wherein each user device is associated with a user profile of a plurality of user profiles. This may be implemented as described and with reference to FIGS. 1-5.

Still referring to FIG. 6, at step 615, method 600 includes aggregating, using an aggregation engine, a plurality of responses to the first prompt, wherein aggregating the plurality of responses comprises receiving, through a user interface of the plurality of user devices, the plurality of responses and registering, using metadata of the user profile, the plurality of responses with a user. In an embodiment, the at least a processor may be further configured to weigh the plurality of responses as a function of the metadata associated with the user using one or more weighted metrics. In an embodiment, weighing the plurality of responses may include classifying the plurality of responses based on a role-based weight of the one or more weighted metrics, determining a coherence datum of the one or more weighted metrics of each response, and assigning a weight to each response as a function of the coherence datum and the role-based weight. In an embodiment, the at least a processor may be further configured to generate, using a large language model, the one or more synthesized outputs by computing semantic embeddings of the plurality of responses, clustering the semantic embeddings, identifying thematic groups based on clustered semantic embeddings, calculating alignment metrics across the thematic groups as a function of the one or more weighted metrics, and prompting the large language model with cluster representatives and metrics to generate the synthesized output. This may be implemented as described and with reference to FIGS. 1-5.

Still referring to FIG. 6, at step 620, method 600 includes generating, using the at least a processor, a synthesized output of one or more synthesized outputs based on the aggregated plurality of responses. In an embodiment, the synthesized output may include one or more strategy statements. In an embodiment, the at least a processor may be further configured to generate a second prompt of the plurality of prompts as a function of the plurality of responses and the synthesized output, transmit the second prompt to the plurality of user devices, aggregate a plurality of second responses to the second prompt, weigh the plurality of second responses, and generate a second synthesized output of the one or more synthesized outputs. In an embodiment, the at least a processor may be further configured to display, using the user interface of each user device, a visualization of the plurality of prompts to the user, wherein the visualization comprises text data and graphical data. In an embodiment, the at least a processor may be further configured to receive feedback associated with the first prompt and generate the second prompt based on the feedback. In an embodiment, the at least a processor may be further configured to generate, using the aggregation engine, iterative prompts based on the plurality of responses and the synthesized output, transmit the iterative prompts to the plurality of user devices, receive updated responses based on the iterative prompts, aggregate the updated responses, and generate a refined synthesized output. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
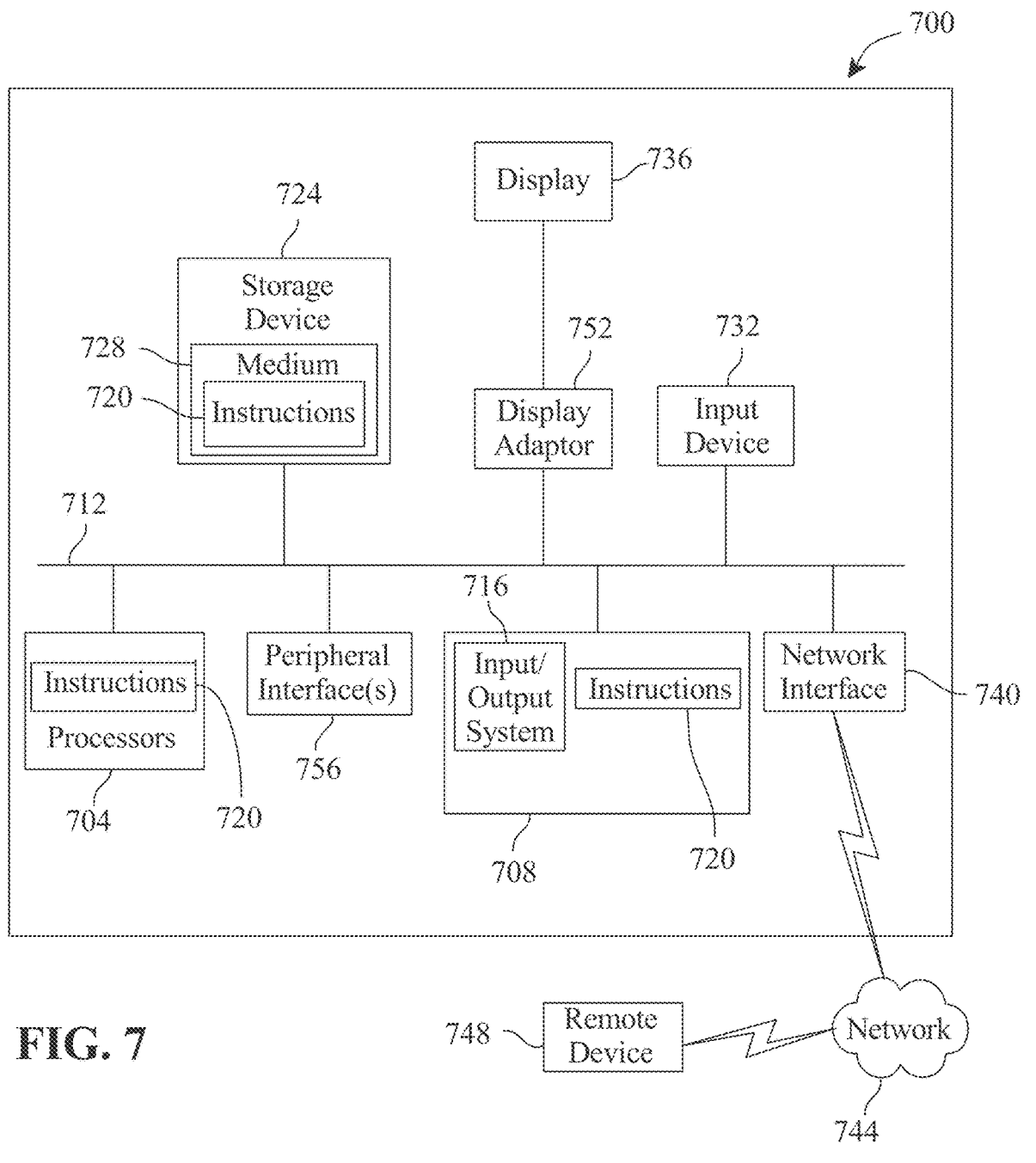
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating one or more synthesized outputs, wherein the apparatus comprises:

at least a computing device, wherein the computing device comprises: a memory; and at least a processor communicatively connected to the memory, wherein the memory contains instructions configuring the processor to:

automatically generate a first prompt of a plurality of prompts by retrieving prompt templates stored in the memory and filling variable fields with entity-specific data, wherein the first prompt is associated with an entity, wherein the first prompt of the plurality of prompts comprises one or more inquiries associated with target data of the entity;

transmit the first prompt to a plurality of user devices, wherein each user device of the plurality of user devices is associated with a user profile of a plurality of user profiles;

aggregate, using an aggregation engine executed on the computing device, a plurality of responses to the first prompt, wherein the aggregating of the plurality of responses comprises: receiving, through a user interface of the plurality of user devices, the plurality of responses; weighting, using one or more weighted metrics of the user profile, the plurality of responses as a function of metadata of the user profile to assign a weight to each response of the plurality of responses, wherein the metadata of the user profile includes a coherence datum and a role-based weight; and registering in a relational table, using the function of the metadata of the user profile, the plurality of responses with a user;

generate, by a large language model executed on the computing device, one or more synthesized outputs based on the aggregated plurality of responses, wherein the generating of the one or more synthesized outputs comprises: computing semantic embeddings of the plurality of responses; and prompting a large language model with metrics and cluster representatives of the semantic embeddings clustered to generate the one or more the synthesized outputs;

transmitting the one or more synthesized outputs for displaying the one or more synthesized outputs at display device of a user device of the plurality of user devices using a visual interface of a user device;

generate, using the aggregation engine, iterative prompts based on the plurality of responses and the one or more synthesized outputs;

transmit the iterative prompts to the plurality of user devices;

receive updated responses from each user device of the plurality of user devices based on the iterative prompts to generate a refined synthesized output, wherein the refined synthesized output includes two of strategy statements, recommendations, and prioritized objectives.

2. The apparatus of claim 1, wherein weighing the plurality of responses comprises:

classifying the plurality of responses based on a role-based weight of the one or more weighted metrics;

determining a coherence datum of the one or more weighted metrics of each response; and assigning a weight to each response as a function of the coherence datum and the role-based weight.

3. The apparatus of claim 1, wherein the processor is further configured to generate, using a large language model, the one or more synthesized outputs by:

clustering the semantic embeddings;

identifying thematic groups based on clustered semantic embeddings; and calculating alignment metrics across the thematic groups as a function of the one or more weighted metrics.

4. The apparatus of claim 1, wherein the at least a-processor is further configured to:

aggregate the updated responses; and generate a refined synthesized output.

5. The apparatus of claim 1, wherein the synthesized output comprises one or more strategy statements.

6. The apparatus of claim 1, wherein the processor is further configured to:

generate a second prompt of the plurality of prompts as a function of the plurality of responses and the synthesized output;

transmit the second prompt to the plurality of user devices;

aggregate a plurality of second responses to the second prompt;

weigh the plurality of second responses; and generate a second synthesized output of the one or more synthesized outputs.

7. The apparatus of claim 6, wherein the processor is further configured to:

receive feedback associated with the first prompt; and generate the second prompt based on the feedback.

8. The apparatus of claim 1, wherein the processor is further configured to display, using the user interface of each user device, a visualization of the plurality of prompts to the user, wherein the visualization comprises text data and graphical data.

9. A method for generating one or more synthesized outputs, wherein the method comprises:

automatically generating, by at least a processor of a computing device, a first prompt of a plurality of prompts by retrieving prompt templates stored in a memory and filling variable fields with entity-specific data, wherein the first prompt is associated with an entity, wherein the first prompt of the plurality of prompts comprises one or more inquiries associated with target data of the entity;

transmitting, by the processor, the first prompt to a plurality of user devices, wherein each user device of the plurality of user devices is associated with a user profile of a plurality of user profiles;

aggregating, using an aggregation engine executed on the computing device, a plurality of responses to the first prompt, wherein the aggregating of the plurality of responses comprises: receiving, through a user interface of the plurality of user devices, the plurality of responses; weighting, using one or more weighted metrics of the user profile, the plurality of responses as a function of metadata of the user profile to assign a weight to each response of the plurality of responses, wherein the metadata of the profile includes a coherence datum and a role-based weight; and registering in a relational table, using the function of the metadata of the user profile, the plurality of responses with a user;

generating, by the processor and using a large language model executed on the computing device, one or more synthesized outputs based on the aggregated plurality of responses, wherein the generating of the one or more synthesized outputs comprises: computing semantic embeddings of the plurality of responses; and prompting a large language model with metrics and cluster representatives of the semantic embeddings clustered to generate the one or more the synthesized outputs;

transmitting, by the processor, the one or more synthesized outputs for displaying the one or more synthesized outputs at display device of a user device of the plurality of user devices using a visual interface of a user device of the plurality of user devices;

generate, by the processor and using the aggregation engine, iterative prompts based on the plurality of responses and the one or more synthesized outputs;

transmit, by the processor, the iterative prompts to the plurality of user devices; and receive updated responses from each user device of the user devices based on the iterative prompts to generate a refined synthesized output, wherein the refined synthesized output includes two of strategy statements, recommendations, and prioritized objectives.

10. The method of claim 9, wherein weighing the plurality of responses comprises:

classifying, by the processor, the plurality of responses based on a role-based weight of the one or more weighted metrics;

determining, by the processor, a coherence datum of the one or more weighted metrics of each response; and assigning, by the processor, a weight to each response as a function of the coherence datum and the role-based weight.

11. The method of claim 9, further comprising generating, using a large language model, the one or more synthesized outputs by:

identifying, by the processor, thematic groups based on clustered semantic embeddings; and calculating, by the processor, alignment metrics across the thematic groups as a function of the one or more weighted metrics.

12. The method of claim 9, further comprising:

aggregating, by the processor, the updated responses; and generating, by the processor, a refined synthesized output.

13. The method of claim 9, wherein the synthesized output comprises one or more strategy statements.

14. The method of claim 9, further comprising:

generating, by the processor a second prompt of the plurality of prompts as a function of the plurality of responses and the synthesized output;

transmit the second prompt to the plurality of user devices;

aggregate a plurality of second responses to the second prompt;

weigh the plurality of second responses; and generate a second synthesized output of the one or more synthesized outputs.

15. The method of claim 14, further comprising:

receiving, by the processor, feedback associated with the first prompt; and generating, by the processor, the second prompt based on the feedback.

16. The method of claim 9, further comprising displaying, using the user interface of each user device, a visualization of the plurality of prompts to the user, wherein the visualization comprises text data and graphical data.

* * * * *